A. S. ATWATER & D. F. SELZER.
BATTERY PLATE.
APPLICATION FILED JAN. 2, 1914.
1,144,628.
Patented June 29, 1915.
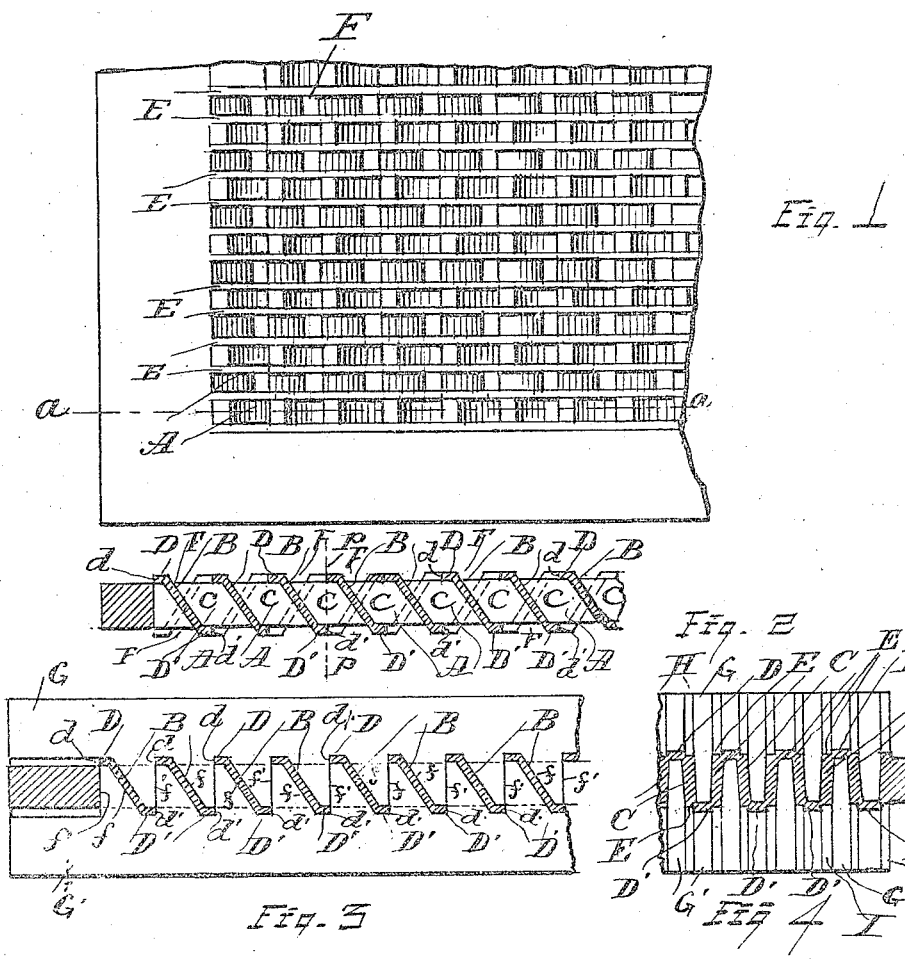
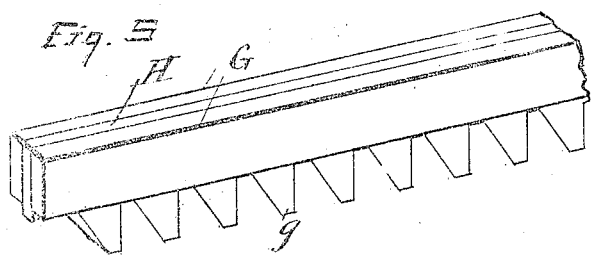
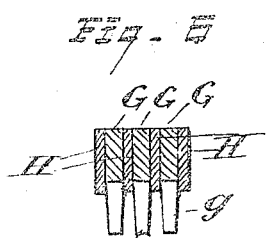

UNITED STATES PATENT OFFICE.

ARTHUR S. ATWATER AND DANIEL F. SELZER, OF CLEVELAND, OHIO.

BATTERY-PLATE.

1,144,628.

Specification of Letters Patent.   Patented June 29, 1915.

Application filed January 2, 1914. Serial No. 809,931.

*To all whom it may concern:*

Be it known that we, ARTHUR S. ATWATER and DANIEL F. SELZER, citizens of the United States, and residents of Cleveland, in the county of Cuyahoga and State of Ohio, have invented certain new and useful Improvements in Battery-Plates, of which we hereby declare the following to be a full, clear, and exact description, such as will enable others skilled in the art to which it appertains to make and use the same.

The objects of the invention are to produce a battery plate in which is provided the maximum amount of porosity and therewith an increased amount of surface is obtained for the deposit of active material thereon and also to produce a plate in which no inner core is required to support the walls of the cavities and hence to provide an extremely light and efficient form of plate in which no blind pockets are formed where gas can collect, the gas having a detrimental effect in its tendency to force the material out of the porous cells formed in the plate.

Further objects are to provide a porous plate through which the electrolyte will have full circulation and a porous plate of such construction that the greatest possible percentage of the substance constituting the body of the same can be converted into active material, and hence will contribute toward the life of the plate and increase the amount of voltage obtained and efficiency of the battery.

The invention also includes a form of construction which while not retarding or interfering with the action of the electrolyte upon the plate will prevent its escape therefrom, and will not cause the internal resistance or loss of voltage which occurs when deep pockets are employed to the deepest portions of which the electrolyte finds it difficult to penetrate.

A further object is to produce a rigid form of plate within which the lead in the walls of the cells is equally distributed and the walls are substantially of equal thickness throughout, thus gaining the maximum amount of surface exposed to the electrolyte, and in which no useless weight is employed in material required to support the cells of the plate.

The battery plate having the improved form of construction is used in a Planté battery.

The invention comprises a battery plate containing minute closely approximated openings extending therethrough from opposite sides, the walls of which are thin enough to last through the life of the plate and are of substantially equal thickness and partial caps are raised above the surface of the plate and project slightly over the openings on both sides of the plate in reversed positions. These openings are adapted to contain the active material and the projecting caps have intervening passages between them to provide paths for the circulation of the electrolyte, and the circulation of gases which may be generated by the action of the electrolyte.

The invention further comprises the combination and arrangement of parts and construction of details as hereinafter further described, shown in the accompanying drawings and specifically pointed out in the claim.

In the accompanying drawings Figure 1 is a plan view, enlarged, of a portion of a plate showing the improved forms of construction; Fig. 2 is a transverse section thereof on line *a . . . a* Fig. 1; Fig. 3 is a similar section showing the metal dies or molds by means of which the plate is shaped; Fig. 4 is a section taken at right angles to Fig. 3 showing the forming dies and intermediate spacers; Fig. 5 is a perspective view of some of the dies and spacers; Fig. 6 is a transverse section of three forming dies and the spacers which separate them.

In these views A, A are cavities which pass entirely through the body of the plate and are separated on one side as shown in Fig. 2 by parallel inclined partitions or walls B, B of substantially equal thickness, and upon the adjacent sides are separated by means of the parallel partitions or walls C, C, which in the use of the plate can be either horizontal or vertical as desired. Caps D, D' are integrally formed with the material of the partitions at the extremities of the inclined partitions and extend in opposite directions, and are also raised above the plane of the body of the plate. The extremities *d, d'* of these caps slightly overhang the mouths of the openings A, A and the overhanging edge d of the cap at one side of the opening preferably coincides with the plane p—p of the overhanging edge of the cap d', over the opposite edge of the opening.

The partitions or walls B and C are made very thin to provide the maximum amount of surface for the action of the electrolyte during the life of the plate, since the plate is used in a Planté battery. The thickness of the metal at any point in the plate should be determined by the desired purpose of the plate, and the desired life thereof. The thickness shown in the drawings is exaggerated since the thickness required for a life of five years in a Planté plate would not have to be over 40/1000 of an inch. The overhanging caps offer enough protection to the active material to prevent it from flaking or stripping out of the openings, but do not produce pockets of such a character that the electrolyte cannot find access to both sides thereof, and a ready access of the electrolyte to all parts of the walls, when the active material is formed thereon as in the Planté type.

Between the elevated caps are formed parallel passages E, E running in one direction, and F, F running at right angles thereto through which the gases formed by the action of the electrolyte can readily pass and through which the electrolyte can circulate. This structure gives a sort of honeycomb construction to the plate which is possessed of great lightness, strength and rigidity and avoids the necessity for an idle core, and permits the free circulation of the electrolyte and of gases generated by the action thereof when several of the plates are stored in the battery in close proximity to the spacing plates, and in this construction the spacing plates can be perfectly flat and perforated or porous.

These battery plates may be either molded or pressed from a solid plate and the dies for obtaining the shape desired are shown in Figs. 3, 4, 5, and 6. Here G, G' are thin metal plates having toothed edges g, g, and preferably employed in oppositely placed pairs. Each tooth is inclined at f on one side and is vertical at f' on the other side and each tooth is of the thickness of one of the openings A. The plates G, G' are reversed in position so that the vertical edges of their teeth lie in a common plane at f', f'. The inclined partitions are formed between the inclined edges of the teeth, and the overhanging edges d, d' of the caps are formed by the vertical sides of the teeth. The caps themselves are formed between the points and roots of the opposite teeth, and are raised above the body of the plate as shown in Figs. 2, 3, and 4, giving the appearance of an expanded plate.

Between the toothed plates are shown the spacing plates H and I, which are preferably about one half as thick as the toothed plates and of substantially the same thickness as the walls C, C of the openings A, A. The plates H and I are not as wide as the toothed plates and their inner edges form the channels or passages E, E in the surfaces of the battery plate.

Having described the invention what we claim as new and desire to secure by Letters Patent is:

A Planté battery plate consisting of an outer conducting frame and an interior swaged portion comprising a plurality of relatively small parallel substantially Z-shaped partitions forming ridges on the surfaces of the battery plate, and the portions connecting the top and bottom portions of the Z-shaped partition slanting in opposite directions in alternate rows, substantially as described.

In testimony whereof, we hereunto set our hands this 13th day of September 1913.

ARTHUR S. ATWATER.
DANIEL F. SELZER.

In presence of—
CHAS. H. OLDS,
WM. M. MONROE.